United States Patent
Yun

(10) Patent No.: US 7,173,751 B2
(45) Date of Patent: Feb. 6, 2007

(54) OPEN HOLE-BASED DIFFRACTIVE LIGHT MODULATOR

(75) Inventor: Sang Kyeong Yun, Kyunggi-do (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 59 days.

(21) Appl. No.: 10/952,573

(22) Filed: Sep. 28, 2004

(65) Prior Publication Data

US 2005/0243403 A1    Nov. 3, 2005

(30) Foreign Application Priority Data

Apr. 29, 2004    (KR) .................. 10-2004-0030159

(51) Int. Cl.
  *G02B 26/00*    (2006.01)
(52) U.S. Cl. .................. 359/291; 359/290; 359/292
(58) Field of Classification Search ................ 359/291, 359/290, 292, 295, 298, 294, 303, 318, 323
  See application file for complete search history.

(56) References Cited

U.S. PATENT DOCUMENTS

| 5,311,360 | A | 5/1994 | Bloom et al. |
| 5,949,570 | A | 9/1999 | Shiono et al. |
| 6,141,139 | A | 10/2000 | Furlani et al. |
| 2005/0068609 | A1* | 3/2005 | Trisnadi et al. ............. 359/291 |
| 2005/0237743 | A1* | 10/2005 | Payne et al. ................ 362/271 |

* cited by examiner

*Primary Examiner*—Alicia M. Harrington
*Assistant Examiner*—Brandi Thomas
(74) *Attorney, Agent, or Firm*—Christensen O'Connor Johnson Kindness PLLC

(57) ABSTRACT

The present invention relates, in general, to a diffractive light modulator and, more particularly, to an open hole-based diffractive light modulator, which includes a lower micromirror positioned on a silicon substrate and an upper micromirror provided with a plurality of open holes spaced apart from the silicon substrate, thus allowing the upper micromirror and the lower micromirror deposited on the silicon substrate to form pixels.

17 Claims, 7 Drawing Sheets

OPEN HOLE-BASED DIFFRACTIVE LIGHT MODULATOR

BACKGROUND OF THE INVENTION

1. Field of the Invention

The present invention relates, in general, to a diffractive light modulator and, more particularly, to an open hole-based diffractive light modulator, which includes a lower micromirror positioned on a silicon substrate and an upper micromirror provided with open holes spaced apart from the silicon substrate, thus allowing the upper and lower micromirrors to form pixels.

2. Description of the Related Art

Generally, an optical signal processing technology has advantages in that a great amount of data is quickly processed in a parallel manner unlike a conventional digital information processing technology in which it is impossible to process a great amount of data in real time. Studies have been conducted on the design and production of a binary phase filter, an optical logic gate, a light amplifier, an image processing technique, an optical device, and a light modulator using a spatial light modulation theory.

The spatial light modulator is applied to optical memory, optical display device, printer, optical interconnection and hologram fields, and studies have been conducted to develop a display device employing it.

The spatial light modulator is embodied by a reflective deformable grating light modulator 10 as shown in FIG. 1. The modulator 10 is disclosed in U.S. Pat. No. 5,311,360 by Bloom et al. The modulator 10 includes a plurality of reflective deformable ribbons 18, which have reflective surface parts, are suspended on an upper part of a silicon substrate 16, and are spaced apart from each other at regular intervals. An insulating layer 11 is deposited on the silicon substrate 16. Subsequently, a sacrificial silicon dioxide film 12 and a low-stress silicon nitride film 14 are deposited.

The nitride film 14 is patterned by the ribbons 18, and a portion of the silicon dioxide film 12 is etched, thereby maintaining the ribbons 18 on the oxide spacer layer 12 by a nitride frame 20.

In order to modulate light having a single wavelength of $\lambda$, the modulator is designed so that thicknesses of the ribbon 18 and oxide spacer 12 are each $\lambda/4$.

Limited by a vertical distance (d) between a reflective surface 22 of each ribbon 18 and a reflective surface of the substrate 16, a grating amplitude of the modulator 10 is controlled by applying voltage between the ribbon 18 (the reflective surface 22 of the ribbon 18 acting as a first electrode) and the substrate 16 (a conductive layer 24 formed on a lower side of the substrate 16 to act as a second electrode).

In an undeformed state of the light modulator with no voltage application, the grating amplitude is $\lambda/2$ while a total round-trip path difference between light beams reflected from the ribbon and substrate is $\lambda$. Thus, a phase of reflected light is reinforced.

Accordingly, in the undeformed state, the modulator 10 acts as a plane mirror when it reflects incident light. In FIG. 2, the reference numeral 20 denotes the incident light reflected by the modulator 10 in the undeformed state.

When proper voltage is applied between the ribbon 18 and substrate 16, the electrostatic force enables the ribbon 18 to move downward toward the surface of the substrate 16. At this time, the grating amplitude is changed to $\lambda/4$. The total round-trip path difference is a half of a wavelength, and light reflected from the deformed ribbon 18 and light reflected from the substrate 16 are subjected to destructive interference.

The modulator diffracts incident light 26 using the interference. In FIG. 3, reference numerals 28 and 30 denote light beams diffracted in +/− diffractive modes (D+1, D−1) in the deformed state, respectively.

However, the light modulator by Bloom adopts an electrostatic method to control the position of a micromirror, which is disadvantageous in that operation voltage is relatively high (usually 30 V or so) and the relationship between the applied voltage and displacement is not linear, thus resulting in poor reliability in the control of light.

Meanwhile, the light modulators described in the patents of Bloom can be used as devices for displaying images. In this case, a minimum of two adjacent elements may form a single pixel. Of course, three elements may form a single pixel, or four or six elements may form a single pixel.

However, the light modulators described in the patents of Bloom have a limitation in achieving miniaturization. That is, the light modulators have a limitation in that the widths of the elements thereof cannot be formed to be below 3 μm and the interval between elements cannot be formed to be below 0.5 μm.

Furthermore, a minimum of two elements is required to constitute a diffraction pixel, thus having a limitation in the miniaturization of a device.

In order to solve such problems, a light modulator capable of achieving miniaturization by forming a plurality of protrusions on a micromirror layer is disclosed in Korean Pat. No. P2004-29925 entitled "Hybrid light modulator."

In the disclosed hybrid light modulator, a plurality of protrusions is provided on the micromirror layer that diffracts incident light by reflecting the incident light. The protrusions are formed in square pillar (bar) shapes, and are arranged to be spaced apart from each other by a regular interval (e.g., the same as the width of the protrusions) along the longitudinal side of the element passing through a recess.

Furthermore, each of the protrusions includes a support the bottom of which is attached to the top surface of the micromirror of the element, and a mirror layer that is formed on the top of the support and adapted to diffract incident light by reflecting the incident light.

In this case, the single mirror layer of one of the protrusions and the portion of the micromirror layer of the element positioned between protrusions form a single pixel.

However, in order to manufacture the hybrid light modulator having such protrusions, a process of separately forming protrusions on the micromirror layer is required, thus incurring additional costs at the time of manufacturing the hybrid light modulator.

SUMMARY OF THE INVENTION

Accordingly, the present invention has been made keeping in mind the above problems occurring in the prior art, and an object of the present invention is to provide an open hole-based diffractive light modulator, which includes a lower micromirror positioned on a silicon substrate and an upper micromirror provided with open holes spaced apart from the silicon substrate, thus allowing the upper and lower micromirrors to form pixels.

In order to accomplish the above object, the present invention provides an open hole-based diffractive light modulator including a substrate; a lower micromirror layer formed on the portion of the surface of the substrate and adapted to diffract incident light by reflecting the incident light; a ribbon-shaped upper micromirror layer which is spaced apart at the center portion thereof from the lower micromirror layer, and is attached at both sides thereof to the top surface of the substrate, with a plurality of open holes formed on the center portion spaced apart from the lower micromirror layer, so that the upper micromirror layer reflects or diffracts incident light depending on the height difference between the upper and lower micromirror layers; and an actuating unit for vertically moving the center portion of the upper micromirror layer in which the open holes are formed.

In order to accomplish the above object, the present invention provides an open hole-based diffractive light modulator including a substrate having a recess; a ribbon-shaped lower micromirror layer which is secured at both ends thereof on the sidewalls of the recess to be placed at a middle depth in the recess, so that the center portion of the lower micromirror layer can move vertically to reflect or diffract incident light; a ribbon-shaped upper micromirror layer which is positioned to correspond to the lower micromirror layer, both sides thereof are attached to both sides of the substrate outside the recess of the substrate, respectively, with a plurality of open holes formed on the upper micromirror layer to allow the incident light to pass therethrough toward the lower micromirror layer, so that the upper micromirror layer reflects or diffracts the incident light depending on the height difference between the upper and lower micromirror layers; and an actuating unit for vertically moving the lower micromirror.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
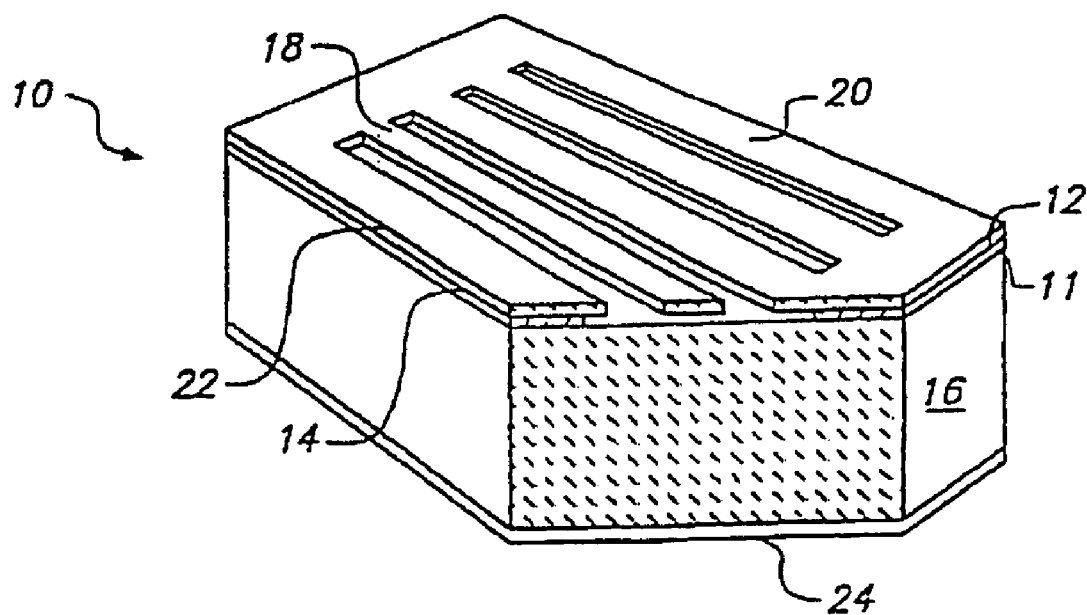
FIG. 1 illustrates a grating light modulator adopting an electrostatic method according to a conventional technology.
Figure 2:
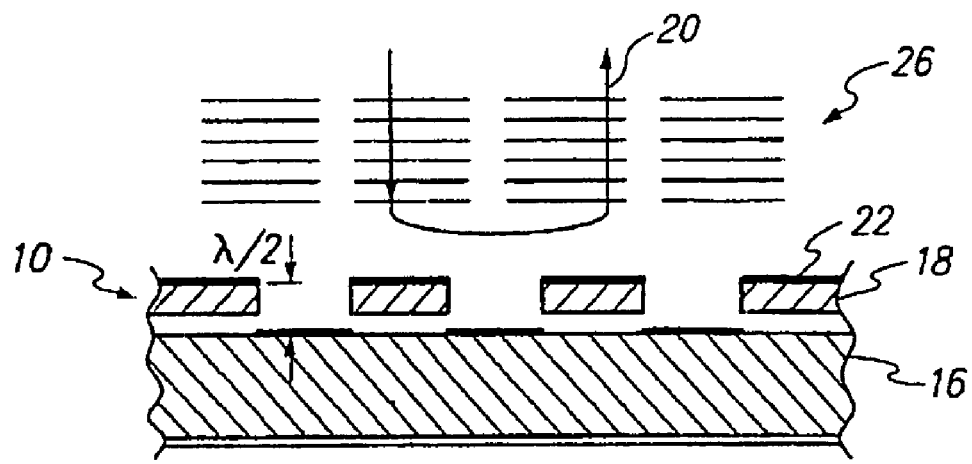
FIG. 2 illustrates reflection of incident light by the grating light modulator adopting the electrostatic method according to the conventional technology in an undeformed state.
Figure 3:
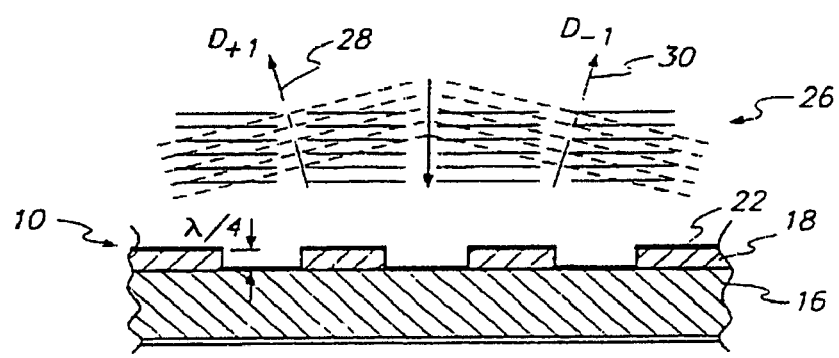
FIG. 3 illustrates diffraction of incident light by the grating light modulator according to the conventional technology in a deformed state caused by an electrostatic force.

Reference now should be made to the drawings, in which the same reference numerals are used throughout the different drawings to designate the same or similar components.

Preferred embodiments of the present invention are described in detail with reference to FIGS. 4a to 6 below.

Figure 4A:
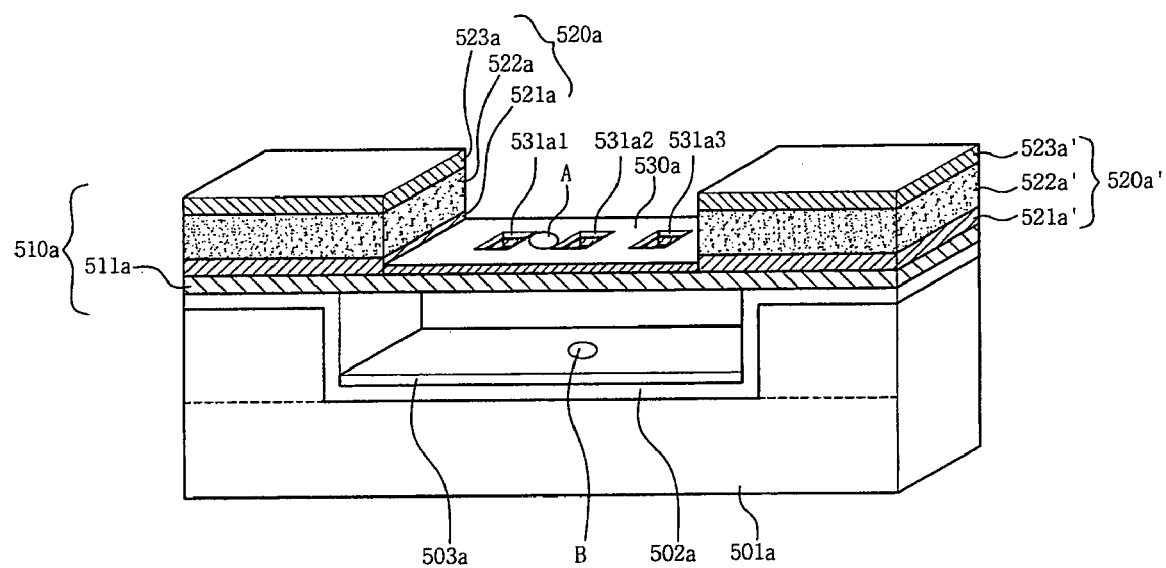
FIG. 4a is a cut-away view showing an open hole-based diffractive light modulator according to a first embodiment of the present invention.

FIG. 4a is a cut-away view showing an open hole-based diffractive light modulator according to a first embodiment of the present invention.

Referring to the drawing, the open hole-based diffractive light modulator according to the first embodiment of the present invention includes a silicon substrate 501a, an insulating layer 502a, a lower micromirror 503a, and an element 510a. Although the insulating layer and the lower micromirror are constructed in separate layers in this embodiment, the insulating layer can be implemented to function as the lower micromirror if it has light-reflective characteristics.

The silicon substrate 501a includes a recess for providing an air space to the element 510a, the insulating layer 502a is formed on the silicon substrate 501a, the lower micromirror 503a is deposited above the silicon substrate 501a, and the bottom of the element 510a is attached to both sides of the silicon substrate 501a outside the recess. A material, such as Si, $Al_2O_3$, $ZrO_2$, Quartz and $SiO_2$, is used to constitute the silicon substrate 501a, and the lower and upper layers of the silicon substrate 501a (divided by a dotted line) may be formed using different materials.

The lower micromirror 503a is deposited above the silicon substrate 501a, and diffracts incident light by reflecting the incident light. Metal, such as Al, Pt, Cr or Ag, can be used to constitute the lower micromirror 503a.

The element 510a is formed in a ribbon shape. The element 510a includes a lower support 511a, the bottoms of both sides of which are attached to both sides of the silicon substrate 501a outside the recess of the silicon substrate 501a so as to allow the center portion of the element 510a to be spaced apart from the recess.

Piezoelectrode layers 520a and 520a' are provided on both sides of the lower support 511a, respectively, and the actuating force of the element 510a is provided through the shrinkage and expansion of the provided piezoelectric layers 520a and 520a'.

Si oxide (e.g., $SiO_2$, etc.), Si nitride (e.g., $Si_3N_4$, etc.), a ceramic substrate (Si, $ZrO_2$ and $Al_2O_3$, etc.), or Si carbide can be used to constitute the lower support 511a. Such a lower support 511a can be omitted according to necessity.

The left or right piezoelectric layer 520a or 520a' includes a lower electrode layer 521a or 521a' adapted to provide piezoelectric voltage, a piezoelectric material layer 522a or 522a' formed on the lower electrode layer 521a or 521a' and adapted to generate a vertical actuating force through shrinkage and expansion when voltage is applied to both sides thereof, and an upper electrode layer 523a or 423a' formed on the piezoelectric material layer 521a or 521a' and adapted to provide piezoelectric voltage to the piezoelectric material layer 521a or 521a'. When voltage is applied to the upper electrode layers 523a and 523a' and the lower electrode layer 521a and 521a', the piezoelectric material layers 521a and 521a' shrink and expand, thus causing the lower support 511a to move vertically.

Pt, Ta/Pt, Ni, Au, Al, Ti/Pt, $IrO_2$ and $RuO_2$ can be used as the materials of the electrodes 521a, 521a', 523a and 523a', and such materials are deposited to have a depth within a range from 0.01 to 3 μm using a sputtering or evaporation method.

Meanwhile, an upper micromirror 530a is deposited at the center portion of the lower support 511a. The upper micromirror 530a includes a plurality of open holes $531a_1$ to $531a_3$. In this case, the open holes $531a_1$ to $531a_3$ are preferably formed in a rectangular shape, but may be formed in any closed shape such as a circle or an ellipse. Furthermore, if the lower support 511a is made of a light-reflective material, a separate upper micromirror does not need to be deposited and the lower support 511a functions as the upper micromirror.

Such open holes $531a_1$ to $531a_3$ allow light incident on the element 510a to pass therethrough so that the light is incident on the portions of the lower micromirror 503a corresponding to the open holes $531a_1$ to $531a_3$, thus enabling the lower and upper micromirrors 503a and 530a to form pixels.

That is, for example, a portion (A) of the upper micromirror 530a, in which the open holes $531a_1$ to $531a_3$ are formed, and a portion (B) of the lower micromirror 503a can form a single pixel.

In this case, incident light passing through the open holes $531a_1$ to $531a_3$ of the upper micromirror 530a can be incident on the corresponding portions of the lower micromirror 503a, and the maximal diffracted light is generated when the height difference between the upper micromirror 530a and the lower micromirror 503a is one of odd multiples of $\lambda/4$.

Figure 4B:
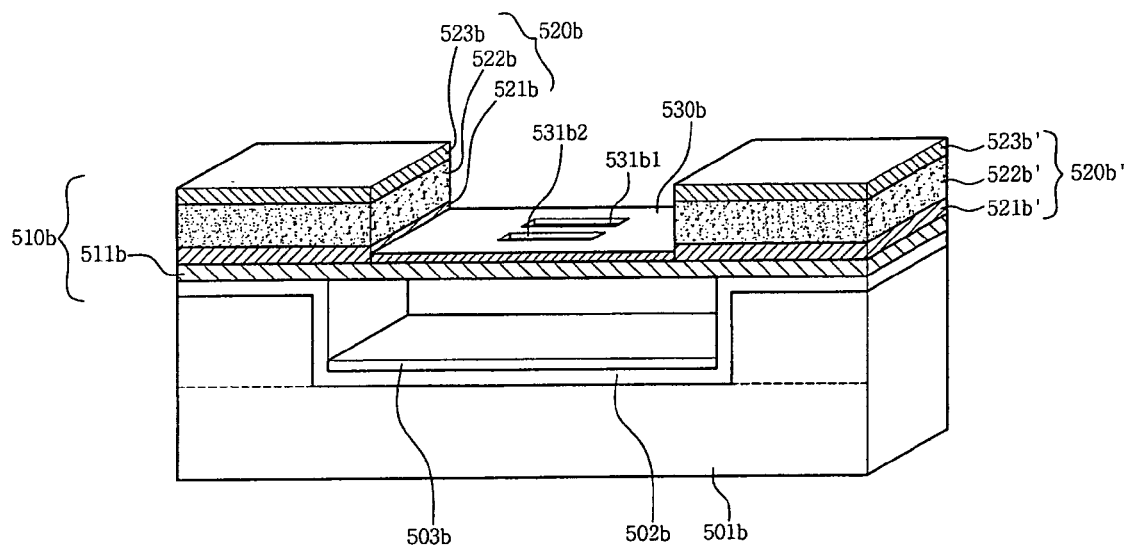
FIG. 4b is a cut-away view showing an open hole-based diffractive light modulator according to a second embodiment of the present invention.

FIG. 4b is a cut-away view showing an open hole-based diffractive light modulator according to a second embodiment of the present invention. The open hole-based diffractive light modulator includes a silicon substrate 501b, a lower micromirror 503b and an element 510b.

The second embodiment shown in FIG. 4b is different from the first embodiment shown in FIG. 4a in that open holes $531b_1$ to $531b_2$ are arranged not in a longitudinal direction but in a transverse direction. The other structures are the same as those of the open hole-based diffractive light modulator shown in FIG. 4a.

Figure 4C:
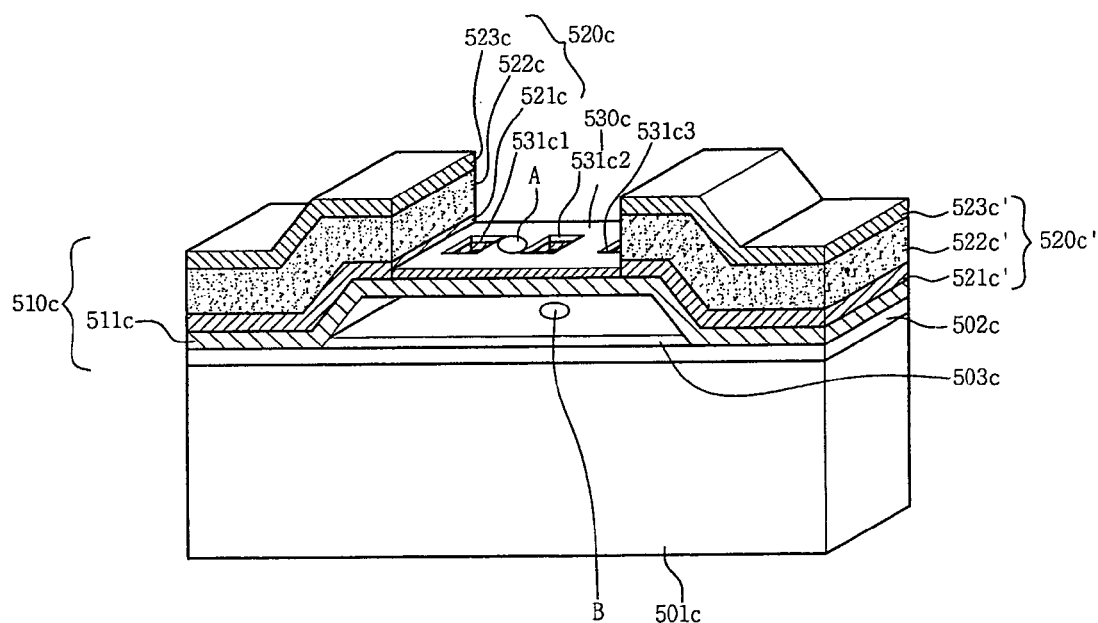
FIG. 4c is a cut-away view showing an open hole-based diffractive light modulator according to a third embodiment of the present invention.

FIG. 4c is a cut-away view showing an open hole-based diffractive light modulator according to a third embodiment of the present invention.

Referring to the drawing, the open hole-based diffractive light modulator according to the third embodiment is different from the open hole-based diffractive light modulator according to the second embodiment in that the lower support 511c of an element 510c is raised from a silicon substrate 501c so as to provide an air space. As a result, the element 510c can move vertically.

That is, the element 510c has a micromirror 530c for diffracting incident light by reflecting the incident light, and can move vertically while being raised from the silicon substrate 501c. In this case, if the lower support has light-reflective characteristics, the lower support can be implemented to function as a micromirror without needing to form a separate micromirror.

The lower support 511c of the element 510c is raised to provide the air space to the element 510c, and both sides thereof are attached to the silicon substrate 501c.

Furthermore, an insulating layer 502c and a micromirror 503c are deposited, and the micromirror 503c diffracts incident light by reflecting the incident light. In this case, if the insulating layer 502c has light-reflective characteristics, the insulating layer 502c can be implemented to function as the micromirror without needing to form a separate micromirror.

The element 510c is formed in a ribbon shape, the center portion thereof is positioned to be raised and spaced apart from the silicon substrate 501c, and the bottoms of both sides thereof are attached to the silicon substrate 501c.

Piezoelectrode layers 520c and 520c' form the left and right sides of the upper portion of the element 510c, respectively. The piezoelectric layer 520c or 520c' includes a lower electrode layer 521c or 521c' adapted to provide piezoelectric voltage, a piezoelectric material layer 522c or 522c' formed on the lower electrode layer 521c or 521c' and adapted to generate a vertical actuating force through shrinkage and expansion when voltage is applied to both sides thereof, and an upper electrode layer 523c or 523c' formed on the piezoelectric material layer 522c or 522c' and adapted to provide piezoelectric voltage to the piezoelectric material layer 522c or 522c'.

When voltage is applied to the upper electrode layers 523c and 523c' and the lower electrode layers 521c and 521c', the element 510c moves upward, and diffracts incident light by reflecting the incident light.

An upper micromirror 530c is deposited at the center portion of the element 510c in which the piezoelectric layers 520c and 520c' of the lower support 511c are removed, and open holes $531c_1$ to $531c_3$ are provided in the upper micromirror 530c. In this case, the open holes $531c_1$ to $531c_3$ are preferably formed in a rectangular shape, but can be formed in any closed shape such as a circle or an ellipse.

Such open holes allow the portions of the lower micromirror 503c corresponding to the open holes holes $531c_1$ to $531c_3$, together with the portions of the upper micromirror 530c adjacent to the open holes $531c_1$ to $531c_3$ of the upper micromirror 530c, to form pixels.

That is, for example, a portion (A) of the upper micromirror 530c, in which the open holes $531c_1$ to $531c_3$ are formed, and a portion (B) of the lower micromirror 503c form a single pixel.

In this case, incident light passing through the open holes $531c_1$ to $531c_3$ of the upper micromirror 530c can be incident on the corresponding portions of the lower micromirror 503c, and it can be understood that the maximal diffracted light is generated when the height difference between the upper micromirror 530c and the lower micromirror 503c is one of odd multiples of $\lambda/4$.

Figure 4D:
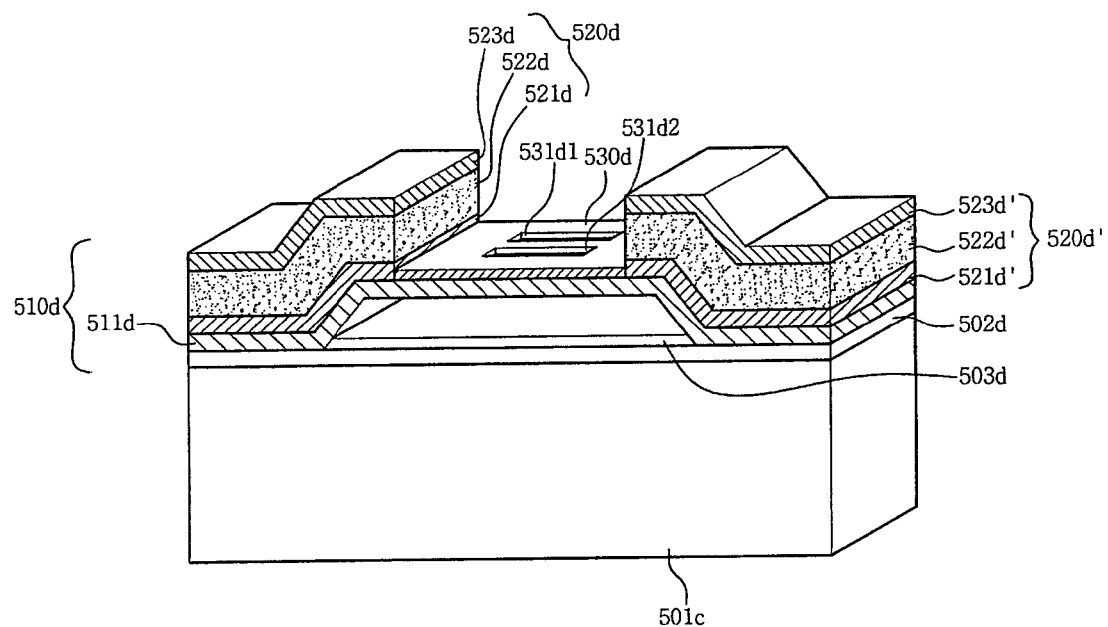
FIG. 4d is a cut-away view showing an open hole-based diffractive light modulator according to a fourth embodiment of the present invention.

FIG. 4d is a cut-away view showing an open hole-based diffractive light modulator according to a fourth embodiment of the present invention.

Referring to the drawing, the open hole-based diffractive light modulator according to the fourth embodiment is different from the open hole-based diffractive light modulator according to the third embodiment in that open holes are arranged in a transverse direction. The other structures are the same as those of the open hole-based diffractive light modulator shown in FIG. 4c.

Figure 4E:
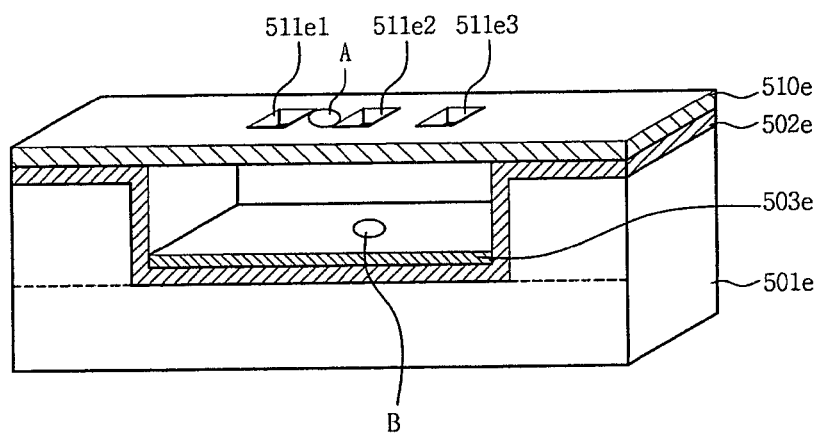
FIG. 4e is a cut-away view showing an open hole-based diffractive light modulator according to a fifth embodiment of the present invention.

FIG. 4e is a cut-away view showing an open hole-based diffractive light modulator according to a fifth embodiment of the present invention. Referring to the drawing, the open hole-based diffractive light modulator according to the fifth embodiment includes a silicon substrate 501e, a lower micromirror 503e formed on the silicon substrate 501e, and an upper micromirror 510e.

In this case, the lower micromirror 503e functions as a lower electrode, and diffracts incident light by reflecting the incident light.

The upper micromirror 510e includes open holes $511e_1$ to $511e_3$. The open holes $511e_1$ to $511e_3$ are preferably formed in a rectangular shape, but can be formed in any closed shape such as a circle or an ellipse.

Such open holes $511e_1$ to $511e_3$ allow the portions of the lower micromirror 503e corresponding to the open holes $511e_1$ to $511e_3$, together with the portions of the upper micromirror 510e adjacent to the open holes $511e_1$ to $511e_3$, to form pixels.

That is, for example, a portion (A) of the upper micromirror 510e, in which open holes $511e_1$ to $511e_3$ are formed, and a portion (B) of the lower micromirror 503e form a single pixel.

In this case, incident light passing through the open holes $511e_1$ to $511e_3$ of the upper micromirror 510e can be incident on the corresponding portions of the lower micromirror 503e, and the maximal diffracted light is generated when the height difference between the upper micromirror 510e and the lower micromirror 503e is one of odd multiples of $\lambda/4$.

Figure 4F:
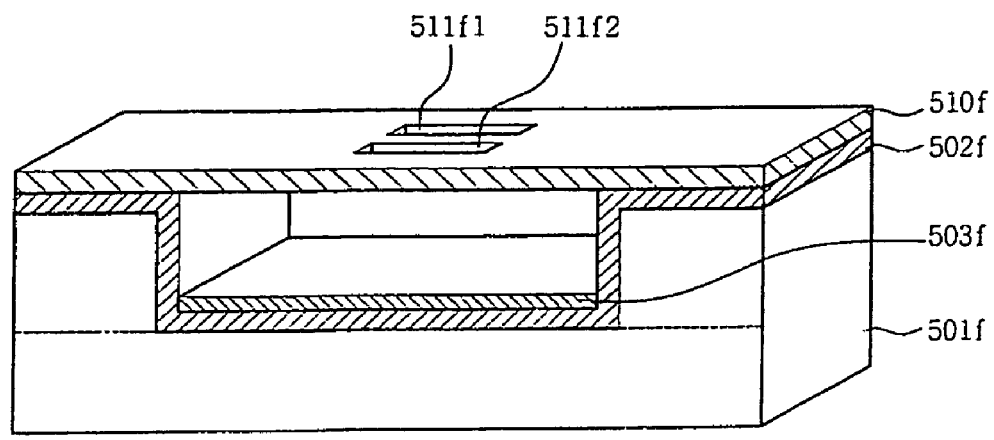
FIG. 4f is a cut-away view showing an open hole-based diffractive light modulator according to a sixth embodiment of the present invention.

FIG. 4f is a cut-away view showing an open hole-based diffractive light modulator according to a sixth embodiment of the present invention.

Referring to the drawing, the open hole-based diffractive light modulator according to the sixth embodiment is different from the open hole-based diffractive light modulator according to the fifth embodiment in that open holes are arranged in a transverse direction. The other structures are the same as those of the open hole-based diffractive light modulator shown in FIG. 4e. Meanwhile, a vertical actuating force is generated using the piezoelectric material layers in the first to fourth embodiments of the present invention, and a vertical actuating force is generated using an electrostatic force in the fifth and sixth embodiments of the present invention. However, such a vertical actuating force can be generated using an electromagnetic force.

Figure 4G:
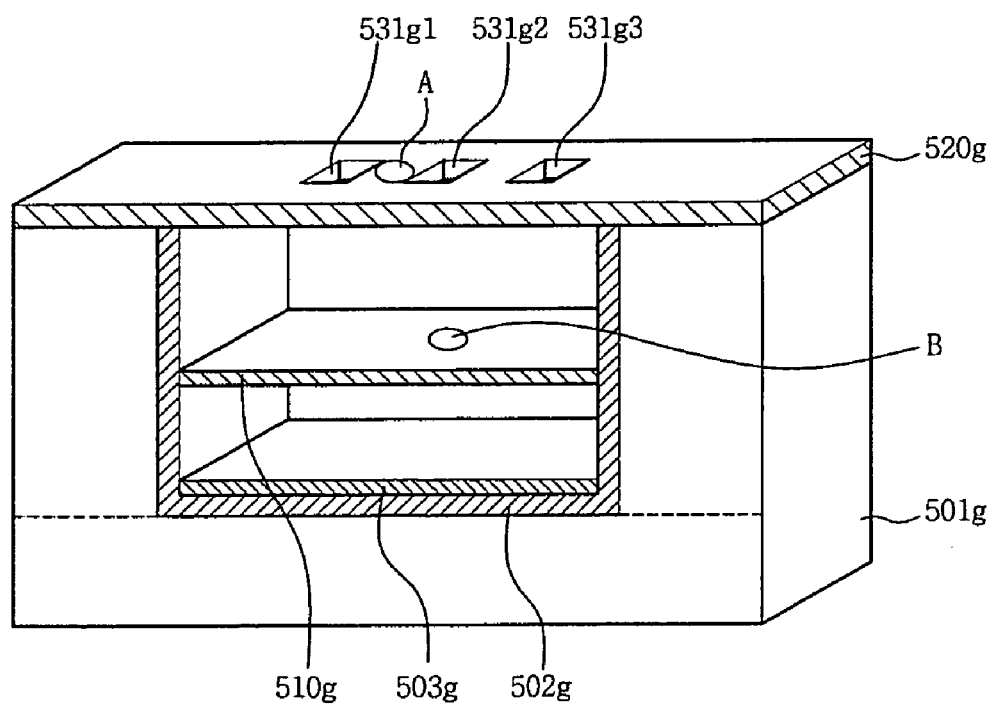
FIG. 4g is a cut-away view showing an open hole-based diffractive light modulator according to a seventh embodiment of the present invention.

FIG. 4g is a cut-away view showing an open hole-based diffractive light modulator according to a seventh embodiment of the present invention.

Referring to the drawing, the open hole-based diffractive light modulator according to the seventh embodiment includes a silicon substrate 501g, a lower micromirror 510g formed in the middle of the recess of the silicon substrate 501g, and an upper micromirror 520g adapted to span the uppermost surfaces of the silicon substrate 501g. The lower micromirror 510g not only diffracts incident light by reflecting the incident light, but is also used as the lower electrode.

A lower electrode layer 503g is formed on the bottom of the recess of the silicon substrate 501g. The lower electrode layer 503g, together with the lower micromirror 510g (upper electrode) positioned in the middle of the recess, provides the lower micromirror 510g with a vertical actuating force that is caused by an electrostatic force.

That is, the lower electrode 503g and the lower micromirror 510g attract each other due to an electrostatic force and generate a downward actuating force if voltage is applied thereto, or the lower electrode 503g and the lower micromirror 510g generate an upward actuating force by a restoring force if the voltage is not applied thereto.

Meanwhile, open holes $521g_1$ to $521g_3$ are provided in the upper micromirror 520g. The open holes $521g_1$ to $521g_3$ are preferably formed in a rectangular shape, but may be formed in any closed shape such as a circle or an ellipse.

Such open holes $521g_1$ to $521g_3$ enable the portions of the lower micromirror 510g corresponding to the open holes $521g_1$ to $521g_3$, together with the portions of the upper micromirror 520g adjacent to the open holes $521g_1$ to $521g_3$, to form pixels.

That is, for example, a portion (A) of the upper micromirror 520g, in which the open holes $521g_1$ to $521g_3$ are formed, and a portion (B) of the lower micromirror 510g form a single pixel.

In this case, incident light passing through the open holes $521g_1$ to $521g_3$ of the upper micromirror 520g can be incident on the corresponding portions of the lower micromirror 510g, and it can be understood that the maximal diffracted light is generated when the height difference between the upper micromirror 520g and the lower micromirror 510a is one of odd multiples of $\lambda/4$.

Figure 4H:
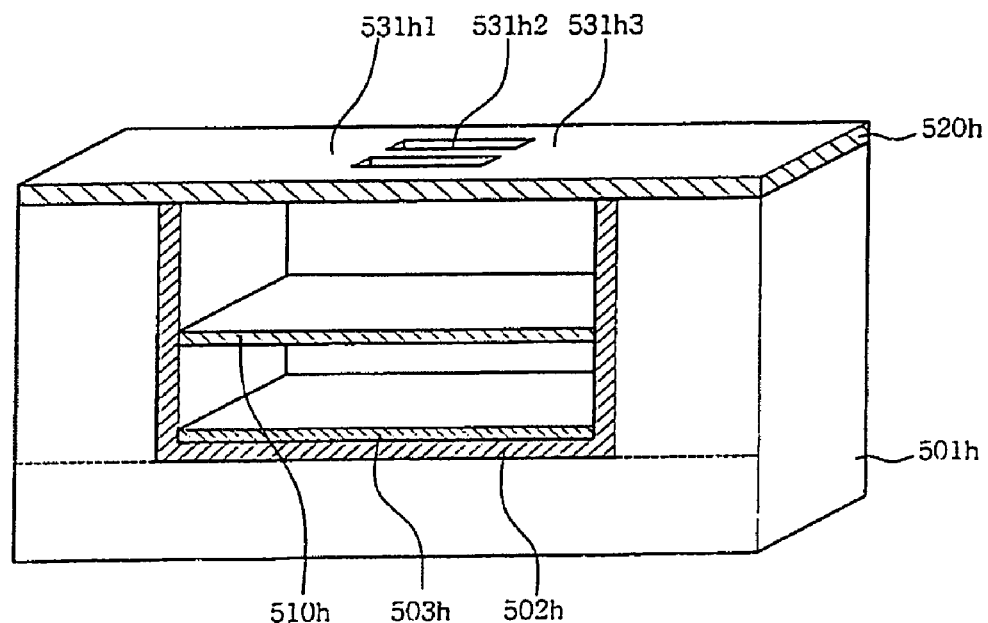
FIG. 4h is a cut-away view showing an open hole-based diffractive light modulator according to an eighth embodiment of the present invention.

FIG. 4h is an open hole-based light modulator according to an eighth embodiment of the present invention. The open hole-based light modulator according to the eighth embodiment is different from the open hole-based light modulator according to the seventh embodiment in that open holes are arranged in a transverse direction.

Figure 5:
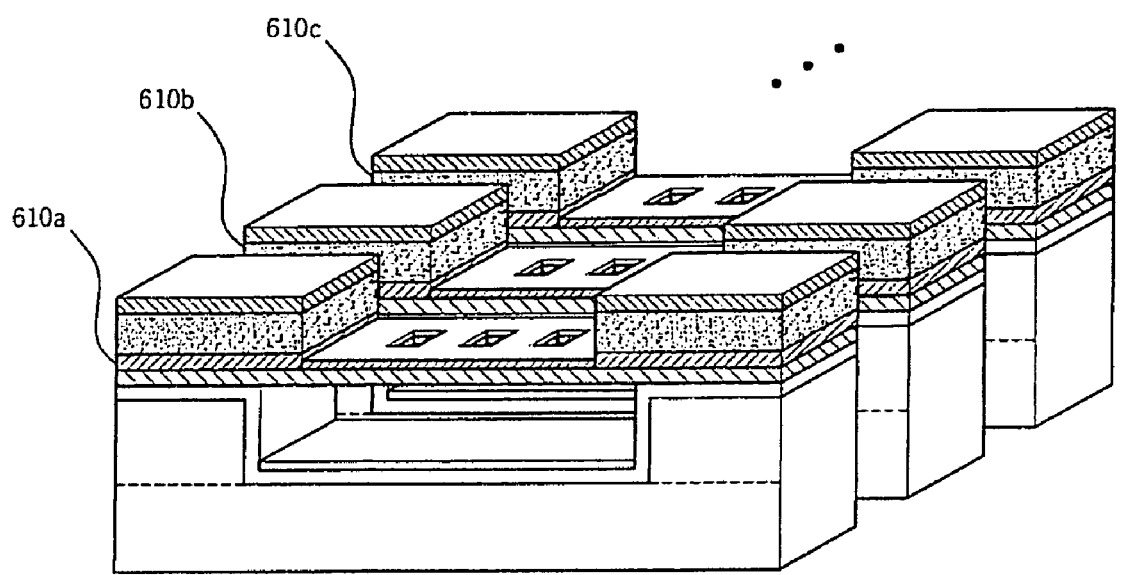
FIG. 5 is a view showing the 1-D array of open-based micromirrors according to the present invention.

FIG. 5 is a perspective view showing the 1-D array of an open hole-based light modulator according to an embodiment of the present invention.

Referring to the drawing, in the 1-D array of the open hole-based light modulator according to the embodiment of the present invention, a plurality of micromirrors 610a to 610n are arranged in a lateral direction, thus diffracting various beams of incident light. Meanwhile, although the vertical actuating of lower micromirror layers caused by an electrostatic force has been described, vertical actuating using a piezoelectric method or an electromagnetic force is possible.

Figure 6:
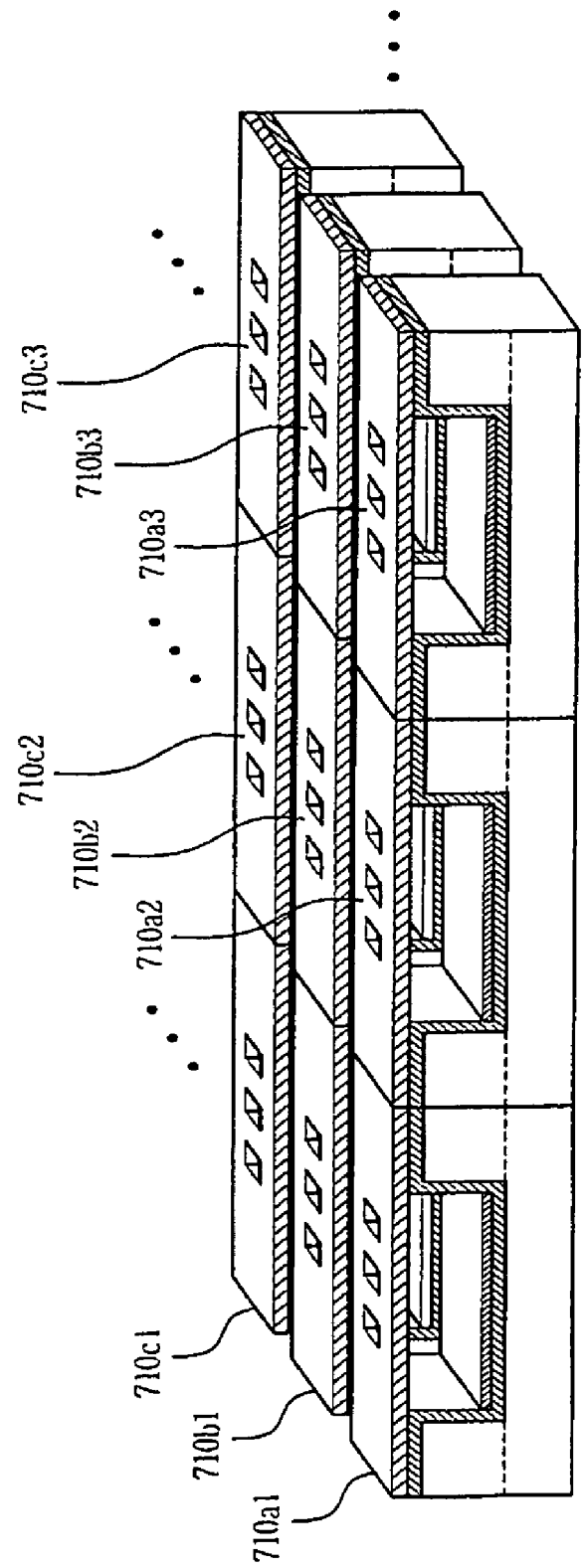
FIG. 6 is a view showing the 2-D array of open hole-based micromirrors according to the present invention.

FIG. 6 is a perspective view showing the 2-D array of an open hole-based light modulator according to an embodiment of the present invention.

Referring to the drawing, in the 2-D array of the open-based light modulator according to the embodiment of the present invention, open hole-based light modulators $710a_1$ to $710n_n$ according to the embodiment of the present invention are arranged in lateral, forward and rearward directions.

The present invention as described above is advantageous in that a light modulator, which can easily provide diffracted light using a single micromirror without additional processes, can be manufactured.

Meanwhile, although the case of a single piezoelectric material layer has been described in this specification, it is possible to implement a multi-type piezoelectric material layer formed of a plurality of piezoelectric material layers.

Although the open hole-based diffractive light modulator of the present invention has been described for illustrative purposes, those skilled in the art will appreciate that various modifications, additions and substitutions are possible, without departing from the scope and spirit of the invention as disclosed in the accompanying claims.

What is claimed is:

1. An open hole-based diffractive light modulator, comprising:
   a substrate;
   a first micromirror layer disposed on a portion of a surface of the substrate and adapted to diffract incident light by reflecting the incident light;
   a second ribbon-shaped micromirror layer which is spaced apart at a center portion thereof from the first micromirror layer, and is attached at both sides thereof to the substrate, with a plurality of open holes formed on the center portion spaced apart from the first micromirror layer, so that the second micromirror layer reflects or diffracts incident light depending on the distance between the second and first micromirror layers; and an actuating unit for moving the center portion of the second micromirror layer in which the open holes are formed away from the first micromirror layer, wherein the actuating unit comprises a piezoelectric layer which is positioned at a location other than the location of the center portion of the second micromirror layer, said piezoelectric layer operable to shrink and expand so as to provide an actuating force on the second micromirror layer in a direction away from the first micromirror layer when voltage is applied to opposite sides of the piezoelectric layer.

2. The diffractive light modulator as set forth in claim 1, wherein the actuating unit actuates the second micromirror layer so that the second micromirror layer can move between a first position that allows the second micromirror layer and the first micromirror layer to form a planar mirror, and a second position that allows the second micromirror layer and the first micromirror layer to diffract incident light.

3. The diffractive light modulator as set forth in claim 1, wherein:

the substrate is provided with a recess to provide an air space;

the first micromirror layer is formed on a bottom of the recess of the substrate; and the second micromirror layer secures an actuating space in such a way that the center portion thereof is spaced apart from the recess of the substrate.

4. The diffractive light modulator as set forth in claim 1, wherein the substrate has a planar surface, and the second micromirror layer secures an actuating space in such a way that the center portion thereof is moved to be spaced further apart from the micromirror layer.

5. The diffractive light modulator as set forth in claim 1, wherein the open holes of the second micromirror layer are arranged in a longitudinal direction of the substrate.

6. The diffractive light modulator as set forth in claim 1, wherein the open holes of the second micromirror layer are arranged in a direction lateral to a longitudinal direction of the substrate.

7. The diffractive light modulator as set forth in claim 1, wherein the actuating unit comprises:

a first piezoelectric layer which is positioned at a first end thereof on a first end of the second micromirror layer, and at a second end thereof on a first side of the center portion of the second micromirror layer to be spaced apart from a center of the second micromirror layer, with a thin-film piezoelectric material layer provided in the first piezoelectric layer to provide a vertical actuating force through shrinkage and expansion when voltage is applied to both sides of the piezoelectric material layer; and a second piezoelectric layer which is positioned at a first end thereof on a second end of the second micromirror layer, and at a second end thereof on a second side of the center of the second micromirror layer to be spaced apart from the center of the second micromirror layer, with a piezoelectric material layer provided in the second piezoelectric layer to provide a vertical actuating force through shrinkage and expansion when voltage is applied to both sides of the piezoelectric material layer.

8. The diffractive light modulator as set forth in claim 7, wherein:

the first piezoelectric layer comprises:

a first piezoelectric material layer which is positioned at a first end thereof on a first end of the first micromirror layer, and at a second end thereof on a first side of the center portion of the first micromirror layer to be spaced apart from a center of the first micromirror layer, and is adapted to generate an actuating force through shrinkage and expansion when voltage is applied to both sides thereof, and a first electrode layer formed on the first piezoelectric material layer and adapted to provide piezoelectric voltage; and the second piezoelectric layer comprises:

a second piezoelectric material layer which is positioned at a first end thereof on a second end of the lower micromirror layer, and at a second end thereof on a second side of the center portion of the first micromirror layer to be spaced apart from the center of the first micromirror layer, and is adapted to generate an actuating force through shrinkage and expansion when voltage is applied to both sides thereof, and a second electrode layer formed on the second piezoelectric material layer and adapted to provide piezoelectric voltage;

wherein the first micromirror layer functions as electrodes of the first and second piezoelectric layers.

9. The diffractive light modulator as set forth in claim 7, wherein:

the first piezoelectric layer comprises:

a plurality of first piezoelectric material layers which are positioned at first ends thereof on a first end of the first micromirror layer, and at second ends thereof on a first side of the center portion of the first micromirror layer to be spaced apart from the center of the first micromirror layer, and is adapted to generate an actuating force through shrinkage and expansion when voltage is applied to both sides thereof, a plurality of first electrode layers formed between the first piezoelectric material layers and adapted to provide piezoelectric voltage, and a second electrode layer formed on a surface of the first piezoelectric material layers and adapted to provide piezoelectric voltage; and the second piezoelectric layer comprises:

a plurality of second piezoelectric material layers which are positioned at first ends thereof on a second end of the first micromirror layer, and at second ends thereof on a second side of the center portion of the first micromirror layer to be spaced apart from the center of the first micromirror layer, and is adapted to generate an actuating force through shrinkage and expansion when voltage is applied to both sides thereof, a plurality of third electrode layers formed between the second piezoelectric material layers and adapted to provide piezoelectric voltage, and a fourth electrode layer formed on a surface of the second piezoelectric material layers and adapted to provide piezoelectric voltage;

wherein the first micromirror layer functions as lower electrodes of the first and second piezoelectric layers.

10. The diffractive light modulator as set forth in claim 1, wherein the actuating unit moves the second micromirror layer relative to the first micromirror layer using electromagnetic force.

11. An open hole-based diffractive light modulator, comprising:
- a substrate having a recess;
- a first ribbon-shaped micromirror layer which is secured at opposite ends thereof to the substrate, so that a center portion of the first micromirror layer is spaced from the substrate recess and so that a central portion of the first micromirror layer can move forward or away from the substrate recess to reflect or diffract incident light;
- a ribbon-shaped second micromirror layer which is positioned to correspond to the first micromirror layer, the second micromirror layer attached at opposite ends to the substrate to be spaced from the substrate with the first micromirror layer disposed between the second micromirror layer and the substrate recess, a plurality of open holes formed on the second micromirror layer to allow the incident light to pass therethrough toward the first micromirror layer, so that the second micromirror layer reflects or diffracts the incident light depending on distance separating the second and first micromirror layers; and
- an actuating unit for moving the first micromirror toward and away from the recess and oppositely away and toward the second micromirror.

12. The diffractive light modulator as set forth in claim 11, wherein the actuating unit actuates the second micromirror layer so that the second micromirror layer can move between a first position that allows the second micromirror layer and the first micromirror layer to form a planar mirror, and a second position that allows the second micromirror layer and the first micromirror layer to diffract incident light.

13. The diffractive light modulator as set forth in claim 11, wherein the actuating unit comprises a first electrode layer disposed on the recess and a second electrode comprising the first micromirror layer, and moves the first micromirror layer using an electrostatic force generated between the first electrode layer and the first micromirror layer when voltage is applied to the first micromirror layer.

14. The diffractive light modulator as set forth in claim 11, wherein the open holes of the upper micromirror layer are arranged in a longitudinal direction of the substrate.

15. The diffractive light modulator as set forth in claim 11, wherein the open holes of the upper micromirror layer are arranged in a direction lateral to the longitudinal direction of the substrate.

16. An open hole-based diffractive light modulator, comprising:
- a substrate;
- a first ribbon-shaped micromirror layer disposed on the substrate and adapted to diffract incident light by reflecting the incident light;
- a second ribbon-shaped micromirror layer supported on the substrate so that a central portion of the second micromirror layer is spaced from the first micromirror layer, the second micromirror layer having portions defining a plurality of open holes having a major dimension extending laterally of the length of the second micromirror layer, such second micromirror layer deflecting or diffracting incident light depending on the distance separating the first and second micromirror layers; and
- an actuating unit for moving the central portion of the second micromirror layer, in which the open holes are formed, towards and away from the first micromirror layer.

17. A diffractive light modulator according to claim 16, wherein the actuating unit comprises a piezoelectric layer which is positioned at a first location other than the location of a central portion of the second micromirror layer, said piezoelectric layer operable to shrink and expand so as to provide an actuating force on the second micromirror layer in a direction away from the first micromirror layer when voltage is applied to opposite sides of the piezoelectric layer.

* * * * *